US009650913B2

(12) United States Patent
Annati et al.

(10) Patent No.: US 9,650,913 B2
(45) Date of Patent: *May 16, 2017

(54) TURBOCHARGER TURBINE CONTAINMENT STRUCTURE

(71) Applicant: Caterpillar Inc., Peoria, IL (US)

(72) Inventors: Richard E. Annati, Lafayette, IN (US); Gary W. Powers, Lafayette, IN (US); Jeffrey W. McCormack, Fishers, IN (US); Matthew J. Frick, Novi, MI (US)

(73) Assignee: Caterpillar Inc., Peoria, IL (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/642,033

(22) Filed: Mar. 9, 2015

(65) Prior Publication Data

US 2016/0265382 A1    Sep. 15, 2016

(51) Int. Cl.
*F02D 23/00* (2006.01)
*F01D 17/12* (2006.01)
(Continued)

(52) U.S. Cl.
CPC ............... *F01D 21/04* (2013.01); *F01D 5/02* (2013.01); *F01D 5/12* (2013.01); *F01D 9/041* (2013.01); *F01D 25/08* (2013.01); *F01D 25/162* (2013.01); *F01D 25/24* (2013.01); *F02B 33/40* (2013.01); *F02B 37/00* (2013.01); *F02B 37/24* (2013.01);
(Continued)

(58) Field of Classification Search
CPC ... F01D 21/04; F01D 5/02; F01D 5/12; F01D 9/041; F01D 25/08; F01D 25/162; F01D 25/24; F01D 17/165; F01D 25/28; F01D 25/125; F01N 13/10; F02B 33/40; F02B 37/00; F02M 35/10222; F02M 35/104; F05D 2220/40; F05D 2230/60; F05D 2240/11; F05D 2240/12; F05D 2240/14;
(Continued)

(56) References Cited

U.S. PATENT DOCUMENTS 2,082,379 A    6/1937  Brittain, Jr.
2,630,963 A    3/1953  Schlichtig
(Continued)

FOREIGN PATENT DOCUMENTS

DE          10022052 A1      3/2001
DE       102008058507 A1     5/2010
(Continued)

*Primary Examiner* — Thai Ba Trieu
(74) *Attorney, Agent, or Firm* — Leydig, Voit & Mayer, LTD.

(57) ABSTRACT

A turbocharger is provided that includes a turbine housing including a gas inlet passage. A turbine wheel has a plurality of blades and is arranged in the turbine housing. A bearing housing is connected to the turbine housing. A shaft is rotatably supported in the bearing housing and connected to the turbine wheel. A shroud is arranged in surrounding relation to at least a portion of the turbine wheel, the shroud being arranged in spaced relation from and not in contact with the turbine housing. A fastening system secures the shroud relative to the bearing housing. The fastening system is configured to fracture when a force is exerted on the shroud corresponding to at least a portion of the turbine wheel contacting the shroud.

20 Claims, 8 Drawing Sheets

(51) Int. Cl.

| | | |
|---|---|---|
| *F01D 25/24* | (2006.01) | |
| *F01D 9/00* | (2006.01) | |
| *F04B 17/00* | (2006.01) | |
| *F04B 35/00* | (2006.01) | |
| *F01D 21/04* | (2006.01) | |
| *F01D 9/04* | (2006.01) | |
| *F01D 5/12* | (2006.01) | |
| *F01D 25/16* | (2006.01) | |
| *F01D 5/02* | (2006.01) | |
| *F01D 25/08* | (2006.01) | |
| *F02B 37/00* | (2006.01) | |
| *F02B 33/40* | (2006.01) | |
| *F02B 37/24* | (2006.01) | |
| *F02B 39/00* | (2006.01) | |
| *F02M 35/104* | (2006.01) | |
| *F02M 35/10* | (2006.01) | |

(52) U.S. Cl.
CPC ........... *F02B 39/00* (2013.01); *F02M 35/104* (2013.01); *F02M 35/10222* (2013.01); *F05D 2220/40* (2013.01); *F05D 2230/60* (2013.01); *F05D 2240/11* (2013.01); *F05D 2240/12* (2013.01); *F05D 2240/14* (2013.01); *F05D 2240/15* (2013.01); *F05D 2240/20* (2013.01); *F05D 2260/311* (2013.01); *Y02T 10/144* (2013.01)

(58) Field of Classification Search
CPC ............. F05D 2240/15; F05D 2240/20; F05D 2260/311
USPC ............. 60/602; 415/158–164, 182.1, 174.2; 417/406–407
See application file for complete search history.

(56) References Cited

U.S. PATENT DOCUMENTS

| | | | |
|---|---|---|---|
| 2,717,732 A | 9/1955 | Dailey, Jr. | |
| 2,777,665 A * | 1/1957 | Martinson | F01D 25/28 415/134 |
| 2,860,827 A * | 11/1958 | Egli | F01D 17/165 417/407 |
| 2,935,294 A | 5/1960 | Angell et al. | |
| 3,039,007 A | 6/1962 | Williams et al. | |
| 3,133,693 A | 5/1964 | Holl | |
| 3,390,926 A | 7/1968 | Woollenweber, Jr. | |
| 3,723,022 A | 3/1973 | Olson | |
| 3,887,198 A | 6/1975 | McClure et al. | |
| 4,149,824 A * | 4/1979 | Adamson | F01D 21/006 415/197 |
| 4,389,052 A | 6/1983 | Shimizu et al. | |
| 4,749,334 A | 6/1988 | Byrne | |
| 4,769,993 A | 9/1988 | Kawamura | |
| 4,907,952 A * | 3/1990 | Inoue | F01D 17/165 417/407 |
| 4,948,333 A | 8/1990 | Meer et al. | |
| 5,026,260 A * | 6/1991 | Gutknecht | F01D 25/125 417/407 |
| 5,037,269 A * | 8/1991 | Halberg | F01D 25/246 415/108 |
| 5,048,978 A | 9/1991 | Singh | |
| 5,228,756 A | 7/1993 | Krampera | |
| 5,253,985 A | 10/1993 | Ruetz | |
| 5,299,909 A | 4/1994 | Wulf | |
| 5,443,362 A | 8/1995 | Crites et al. | |
| 5,454,646 A | 10/1995 | Reisdorf | |
| 5,465,482 A | 11/1995 | Elvekjaer et al. | |
| 5,526,640 A | 6/1996 | Brooks et al. | |
| 5,562,419 A * | 10/1996 | Crall | F01D 5/225 416/190 |
| 5,775,819 A | 7/1998 | Kinney et al. | |
| 5,964,574 A | 10/1999 | Meier et al. | |
| 6,045,266 A | 4/2000 | Mitsubori et al. | |
| 6,120,246 A | 9/2000 | Auger et al. | |
| 6,161,768 A | 12/2000 | Gordon et al. | |
| 6,168,375 B1 | 1/2001 | LaRue et al. | |
| 6,220,234 B1 | 4/2001 | Baker et al. | |
| 6,224,332 B1 | 5/2001 | Leach et al. | |
| 6,264,429 B1 | 7/2001 | Koeller et al. | |
| 6,368,077 B1 | 4/2002 | Meyerkord et al. | |
| 6,371,238 B1 | 4/2002 | Svihla | |
| 6,478,553 B1 | 11/2002 | Panos et al. | |
| 6,481,917 B1 | 11/2002 | Chen et al. | |
| 6,499,884 B1 | 12/2002 | Svihla et al. | |
| 6,530,744 B2 | 3/2003 | Liotta et al. | |
| 6,540,480 B2 | 4/2003 | Nikpour | |
| 6,609,881 B2 | 8/2003 | Brown et al. | |
| 6,612,747 B1 | 9/2003 | Jones | |
| 6,629,556 B2 | 10/2003 | Decker et al. | |
| 6,663,347 B2 | 12/2003 | Decker et al. | |
| 6,669,372 B1 | 12/2003 | Martin | |
| 6,709,232 B1 | 3/2004 | Vogiatzis | |
| 6,733,236 B2 | 5/2004 | Sumser et al. | |
| 6,742,989 B2 | 6/2004 | Osako et al. | |
| 6,754,954 B1 | 6/2004 | Decker | |
| 6,767,185 B2 | 7/2004 | Martin et al. | |
| 6,874,998 B2 | 4/2005 | Roby | |
| 6,877,901 B2 | 4/2005 | Wollenweber | |
| 6,904,949 B2 | 6/2005 | Decker et al. | |
| 6,910,863 B2 | 6/2005 | Scardicchio et al. | |
| 6,928,816 B2 | 8/2005 | Leavesley | |
| 6,942,460 B2 | 9/2005 | Osako et al. | |
| 6,968,702 B2 | 11/2005 | Child et al. | |
| 6,979,172 B1 | 12/2005 | Mackenzie | |
| 6,979,183 B2 | 12/2005 | Baumann | |
| 6,994,526 B2 | 2/2006 | Furman et al. | |
| 7,001,143 B2 | 2/2006 | Vogiatzis | |
| 7,001,155 B2 | 2/2006 | Cabrales et al. | |
| 7,008,182 B2 | 3/2006 | Kopp et al. | |
| 7,010,915 B2 | 3/2006 | Stilgenbauer | |
| 7,040,867 B2 | 5/2006 | Louthan et al. | |
| 7,052,241 B2 | 5/2006 | Decker | |
| 7,063,508 B2 | 6/2006 | Higashimori et al. | |
| 7,066,919 B1 | 6/2006 | Sauerland et al. | |
| 7,086,842 B2 | 8/2006 | Wild | |
| 7,097,411 B2 | 8/2006 | Smoke et al. | |
| 7,104,693 B2 | 9/2006 | Mavrosakis | |
| 7,118,335 B2 | 10/2006 | Vacarezza et al. | |
| 7,147,433 B2 | 12/2006 | Ghizawi | |
| 7,204,671 B2 | 4/2007 | Dellmann | |
| 7,214,037 B2 | 5/2007 | Mavrosakis | |
| 7,232,258 B2 | 6/2007 | Garcia | |
| 7,241,416 B2 | 7/2007 | Sweetland | |
| 7,260,892 B2 | 8/2007 | Schilling et al. | |
| 7,329,048 B2 | 2/2008 | Klusman et al. | |
| 7,344,362 B2 | 3/2008 | Kopp et al. | |
| 7,384,236 B2 | 6/2008 | Meier et al. | |
| 7,401,980 B2 | 7/2008 | Krauss et al. | |
| 7,419,304 B2 | 9/2008 | Mavrosakis | |
| 7,428,814 B2 | 9/2008 | Pedersen et al. | |
| 7,461,507 B2 | 12/2008 | Arnold et al. | |
| 7,461,979 B2 | 12/2008 | Mavrosakis | |
| 7,478,532 B2 | 1/2009 | Martin et al. | |
| 7,484,932 B2 | 2/2009 | Aguilar | |
| 7,509,804 B2 * | 3/2009 | Kobayashi | F01D 17/165 415/158 |
| 7,517,154 B2 | 4/2009 | McKeirnan, Jr. | |
| 7,568,883 B2 | 8/2009 | Arnold et al. | |
| 7,600,969 B2 | 10/2009 | Frankenstein et al. | |
| 7,631,497 B2 | 12/2009 | Panek | |
| 7,677,041 B2 | 3/2010 | Woollenweber | |
| 7,686,586 B2 | 3/2010 | Nikpour | |
| 7,722,336 B2 | 5/2010 | Vaccarezza et al. | |
| 7,766,550 B2 | 8/2010 | Larue | |
| 7,771,162 B2 | 8/2010 | Castan | |
| 7,771,170 B2 | 8/2010 | Seiler | |
| 7,793,494 B2 | 9/2010 | Wirth et al. | |
| 7,797,936 B2 | 9/2010 | Hayashi et al. | |
| 7,798,770 B2 | 9/2010 | Sumser et al. | |
| 7,837,448 B2 | 11/2010 | Shimizu et al. | |

(56) References Cited

U.S. PATENT DOCUMENTS

| | | | |
|---|---|---|---|
| 7,845,900 B2 | 12/2010 | Roduner et al. |
| 7,874,136 B2 | 1/2011 | Heyerman |
| 7,878,758 B2 | 2/2011 | Allen et al. |
| 7,918,215 B2 | 4/2011 | Martin et al. |
| 7,946,809 B2 | 5/2011 | Meier et al. |
| 7,987,599 B2 | 8/2011 | Mavrosakis |
| 8,011,885 B2 | 9/2011 | Purdey |
| 8,016,554 B2 | 9/2011 | Ward |
| 8,087,088 B1 | 12/2011 | Pennington et al. |
| 8,118,570 B2 | 2/2012 | Meacham et al. |
| 8,157,516 B2 | 4/2012 | Chen et al. |
| 8,157,543 B2 | 4/2012 | Shimizu |
| 8,162,602 B2 | 4/2012 | Caucheteux et al. |
| 8,162,604 B2 | 4/2012 | Kühnel et al. |
| 8,166,746 B2 | 5/2012 | Heyerman |
| 8,181,632 B2 | 5/2012 | Ueno et al. |
| 8,186,886 B2 | 5/2012 | McKeirnan, Jr. |
| 8,226,296 B2 | 7/2012 | Larue |
| 8,234,867 B2 | 8/2012 | Palazzolo et al. |
| 8,240,921 B2 | 8/2012 | Böning et al. |
| 8,241,006 B2 | 8/2012 | Renett |
| 8,328,509 B2 | 12/2012 | Gee et al. |
| 8,328,535 B2 | 12/2012 | Anschel et al. |
| 8,339,122 B2 | 12/2012 | Cox et al. |
| 8,348,595 B2 | 1/2013 | Koch et al. |
| 8,353,666 B2 | 1/2013 | Masson et al. |
| 8,360,730 B2 | 1/2013 | Chen et al. |
| 8,372,335 B2 | 2/2013 | Claude et al. |
| 8,376,721 B2 | 2/2013 | Thayer et al. |
| 8,398,363 B2 | 3/2013 | Mundinger et al. |
| 8,419,350 B2 | 4/2013 | Just |
| 8,449,190 B2 | 5/2013 | Larue |
| 8,454,242 B2 | 6/2013 | Mavrosakis |
| 8,464,528 B2 | 6/2013 | Sausse et al. |
| 8,464,777 B2 | 6/2013 | Zhu et al. |
| 8,465,261 B2 | 6/2013 | Holzschuh |
| 8,496,452 B2 | 7/2013 | Marsal et al. |
| 8,517,665 B2 | 8/2013 | Lugo et al. |
| 8,517,679 B2 | 8/2013 | Schlienger et al. |
| 8,545,172 B2 | 10/2013 | Severin et al. |
| 8,568,092 B2 | 10/2013 | Matsuyama |
| 8,572,963 B2 | 11/2013 | Cuniberti et al. |
| 8,602,655 B2 | 12/2013 | Tabata |
| 8,621,863 B2 | 1/2014 | Krätschmer et al. |
| 8,622,691 B2 | 1/2014 | Eguchi et al. |
| 8,628,247 B2 | 1/2014 | Uesugi |
| 8,636,413 B2 | 1/2014 | Fiedler et al. |
| 8,641,380 B2 | 2/2014 | McKenzie |
| 8,641,382 B2 | 2/2014 | Weber et al. |
| 8,668,432 B2 | 3/2014 | Sebald et al. |
| 8,696,316 B2 | 4/2014 | Decker et al. |
| 8,702,394 B2 | 4/2014 | Decker et al. |
| 8,727,716 B2 | 5/2014 | Clements et al. |
| 8,734,130 B2 | 5/2014 | Meacham et al. |
| 8,736,393 B2 | 5/2014 | Herault et al. |
| 8,740,465 B2 | 6/2014 | McKeirnan, Jr. |
| 8,763,393 B2 | 7/2014 | Severin et al. |
| 8,764,296 B2 | 7/2014 | Omori |
| 8,764,376 B2 | 7/2014 | Lei et al. |
| 8,764,388 B2 | 7/2014 | Roberts et al. |
| 8,790,066 B2 | 7/2014 | Gutknecht |
| 8,790,574 B2 | 7/2014 | Toda et al. |
| 8,794,905 B2 | 8/2014 | Matsuyama |
| 8,807,840 B2 | 8/2014 | House et al. |
| 8,814,538 B2 | 8/2014 | House et al. |
| 8,827,638 B2 | 9/2014 | Delitz |
| 8,834,111 B2 | 9/2014 | Holzschuh |
| 8,845,271 B2 | 9/2014 | Woollenweber et al. |
| 8,851,417 B2 * | 10/2014 | Sandy .................... B64D 27/26 248/554 |
| 8,961,128 B2 | 2/2015 | Mavrosakis et al. |
| 2011/0182722 A1 * | 7/2011 | Matsuyama .......... F01D 17/165 415/174.2 |
| 2012/0237343 A1 * | 9/2012 | Matsuyama .......... F01D 17/165 415/182.1 |
| 2012/0328418 A1 | 12/2012 | Yang et al. |
| 2013/0000998 A1 | 1/2013 | Trower et al. |
| 2013/0084035 A1 | 4/2013 | Williams et al. |
| 2013/0180242 A1 | 7/2013 | Lancaster |
| 2013/0202432 A1 | 8/2013 | House et al. |
| 2013/0302159 A1 | 11/2013 | Grussmann et al. |
| 2013/0309072 A1 | 11/2013 | Marsal et al. |
| 2014/0053573 A1 | 2/2014 | Josefczyk et al. |
| 2014/0086731 A1 | 3/2014 | Schmidt et al. |
| 2014/0186095 A1 | 7/2014 | Peters et al. |
| 2014/0334918 A1 * | 11/2014 | Ueda .................... F01D 17/165 415/159 |
| 2014/0358363 A1 | 12/2014 | Mavrosakis et al. |
| 2016/0265379 A1 * | 9/2016 | Annati ................ F04D 29/4226 |

FOREIGN PATENT DOCUMENTS

| | | |
|---|---|---|
| DE | 102010064047 A1 | 6/2012 |
| EP | 1357278 A2 | 10/2003 |
| EP | 2420660 A1 | 2/2012 |
| GB | 617763 A | 2/1949 |
| GB | 847242 A | 9/1960 |
| GB | 898164 A | 6/1962 |
| JP | 06-012798 U | 2/1994 |
| JP | 08-254106 A | 10/1996 |
| WO | WO 82/0865 A1 | 3/1982 |
| WO | WO 2013/023930 A1 | 2/2013 |
| WO | WO 2014/109849 A1 | 7/2014 |
| WO | WO 2014/165138 A1 | 10/2014 |

\* cited by examiner

TURBOCHARGER TURBINE CONTAINMENT STRUCTURE

TECHNICAL FIELD

This disclosure relates generally to turbochargers for use with internal combustion engines and, more particularly, to containment structures for the turbine wheel of a turbocharger.

BACKGROUND

Internal combustion engines are supplied with a mixture of air and fuel for combustion within the engine that generates mechanical power. To maximize the power generated by this combustion process, the engine is often equipped with a turbocharged air induction system. A turbocharged air induction system includes a turbocharger that uses exhaust from the engine to compress air flowing into the engine, thereby forcing the air into a combustion chamber of the engine than the engine could otherwise draw into the combustion chamber. This increased supply of air allows for increased fueling, resulting in an increased engine power output.

A turbocharger generally comprises a compressor wheel mounted on one end of a single shaft in a compressor housing and a turbine wheel mounted on the other end of the shaft in a turbine housing. Typically, the turbine housing is formed separately from the compressor housing. A bearing housing is connected between the turbine and compressor housings for containing bearings for the shaft. The turbine housing receives exhaust gas from the engine and directs it to the turbine wheel which is driven by the exhaust gas. The turbine assembly thus extracts power from the exhaust gas and drives the compressor.

The turbine wheel is typically made of a very dense material and rotates at very high speeds during operating of the turbocharger. In order to limit the damage to the turbocharger and engine, measures are generally taken to try to contain the fragments of the turbine wheel in the event that the turbine wheel fails during operation of the turbocharger. One such measure is thick walled, heavy housings surrounding the turbine wheel. However, such housings are relatively expensive and can add significant weight to the turbocharger.

SUMMARY

In one aspect, the disclosure describes a turbocharger including a turbine housing with a gas inlet passage. A turbine wheel has a plurality of blades and is arranged in the turbine housing. A bearing housing is connected to the turbine housing and a shaft is rotatably supported in the bearing housing and connected to the turbine wheel. A shroud is arranged in surrounding relation to at least a portion of the turbine wheel. The shroud is arranged in spaced relation from and not in contact with the turbine housing. A fastening system secures the shroud relative to the bearing housing. The fastening system is configured to fracture when a force is exerted on the shroud corresponding to at least a portion of the turbine wheel contacting the shroud.

In another aspect, the disclosure describes a method for dissipating energy resulting from failure of a rotating turbine wheel in a turbocharger, the turbine wheel being arranged in a turbine housing and being connected to a shaft that is rotatably supported in a bearing housing. The method includes the step of arranging a shroud in surrounding relation to at least a portion of the turbine wheel, the shroud being arranged in spaced relation from and not in contact with the turbine housing. The shroud is secured relative to the bearing housing with a fastening system configured to fracture when a force is exerted on the shroud corresponding to at least a portion of the turbine wheel contacts the shroud. The shroud is configured to rotate relative to turbine housing when the fastening system fractures.

In yet another aspect, the disclosure describes an internal combustion engine having a plurality of combustion chambers formed in a cylinder block, an intake manifold disposed to provide air or a mixture of air with exhaust gas to the combustion chambers, and an exhaust manifold disposed to receive exhaust gas from the combustion chambers. The engine further includes a turbine housing including a gas inlet passage and a turbine wheel that has a plurality of blades and is arranged in the turbine housing. A bearing housing is connected to the turbine housing. A shaft is rotatably supported in the bearing housing and connected to the turbine wheel. A shroud is arranged in surrounding relation to at least a portion of the turbine wheel, the shroud being arranged in spaced relation from and not in contact with the turbine housing. A fastening system secures the shroud relative to the bearing housing, the fastening system being configured to fracture when a force is exerted on the shroud corresponding to at least a portion of the turbine wheel contacting the shroud.

DETAILED DESCRIPTION

Figure 1:
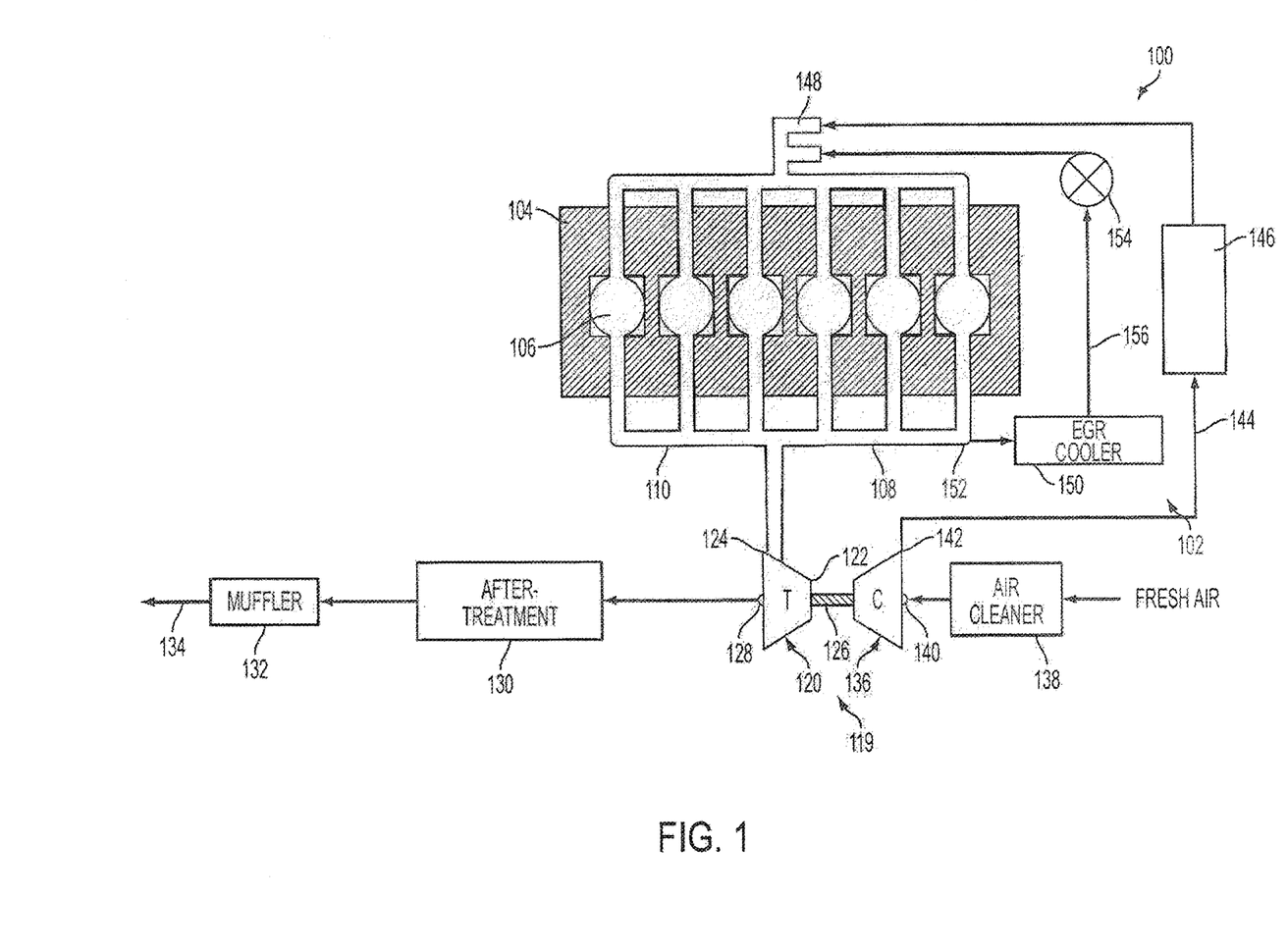
FIG. 1 is a block diagram of an internal combustion engine in accordance with the disclosure.

This disclosure relates to an improved turbocharger used in conjunction with an internal combustion engine to promote the engine's efficient operation and also the robust and reliable operation of the turbocharger. A simplified block diagram of an engine 100 is shown in FIG. 1. The engine 100 includes a cylinder case 104 that houses a plurality of combustion cylinders 106. In the illustrated embodiment, six combustion cylinders are shown in an inline or "I" configuration, but any other number of cylinders arranged in a different configuration, such as a "V" configuration, may be used. The plurality of cylinders 106 is fluidly connected via exhaust valves (not shown) to first and second exhaust conduits 108 and 110. Each of the first and second exhaust conduits 108 and 110 is connected to a turbine assembly 120 of a turbocharger 119. In the illustrated embodiment, the turbine assembly 120 includes a housing 122 having a gas inlet 124, which is fluidly connected to the first and second exhaust conduits 108 and 110 and arranged to receive exhaust gas therefrom. Exhaust gas provided to the turbine assembly 120 causes a turbine wheel (not shown in FIG. 1) connected to a shaft 126 to rotate. Exhaust gas exits the housing 122 of the turbine assembly 120 through an outlet 128. The exhaust gas at the outlet 128 is optionally passed through other exhaust after-treatment components and systems such as an after-treatment device 130 that mechanically and chemically removes combustion byproducts from the exhaust gas stream, and/or a muffler 132 that dampens engine noise, before being expelled to the environment through a stack or tail pipe 134.

Rotation of the shaft 126 causes a compressor wheel (not shown in FIG. 1) of a compressor assembly 136 to rotate. As shown, the compressor assembly 136 may be a radial, mixed-flow or axial compressor configured to receive a flow of fresh, filtered air from an air filter 138 through a compressor inlet 140. Pressurized air at an outlet 142 of the compressor assembly 136 is routed via a charge air conduit 144 to a charge air cooler 146 before being provided to an intake manifold 148 of the engine 100. In the illustrated embodiment, air from the intake manifold 148 is routed to the individual cylinders 106 where it is mixed with fuel and combusted to produce engine power.

An optional EGR system 102 includes an optional EGR cooler 150 that is fluidly connected to an EGR gas supply port 152 of the first exhaust conduit 108. A flow of exhaust gas from the first exhaust conduit 108 can pass through the EGR cooler 150 where it is cooled before being supplied to an EGR valve 154 via an EGR conduit 156. The EGR valve 154 may be electronically controlled and configured to meter or control the flow rate of the gas passing through the EGR conduit 156. An outlet of the EGR valve 154 is fluidly connected to the intake manifold 148 such that exhaust gas from the EGR conduit 156 may mix with compressed air from the charge air cooler 146 within the intake manifold 148 of the engine 100.

The pressure of exhaust gas at the first exhaust conduit 108, which is commonly referred to as back pressure, is higher than ambient pressure, in part, because of the flow restriction presented by the turbine assembly 120. For the same reason, a positive back pressure is present in the second exhaust conduit 110. The pressure of the air or the air/EGR gas mixture in the intake manifold 148, which is commonly referred to as boost pressure, is also higher than ambient because of the compression provided by the compressor assembly 136. In large part, the pressure difference between back pressure and boost pressure, coupled with the flow restriction and flow area of the components of the EGR system 102, determine the maximum flow rate of EGR gas that may be achieved at various engine operating conditions.

Figure 2:
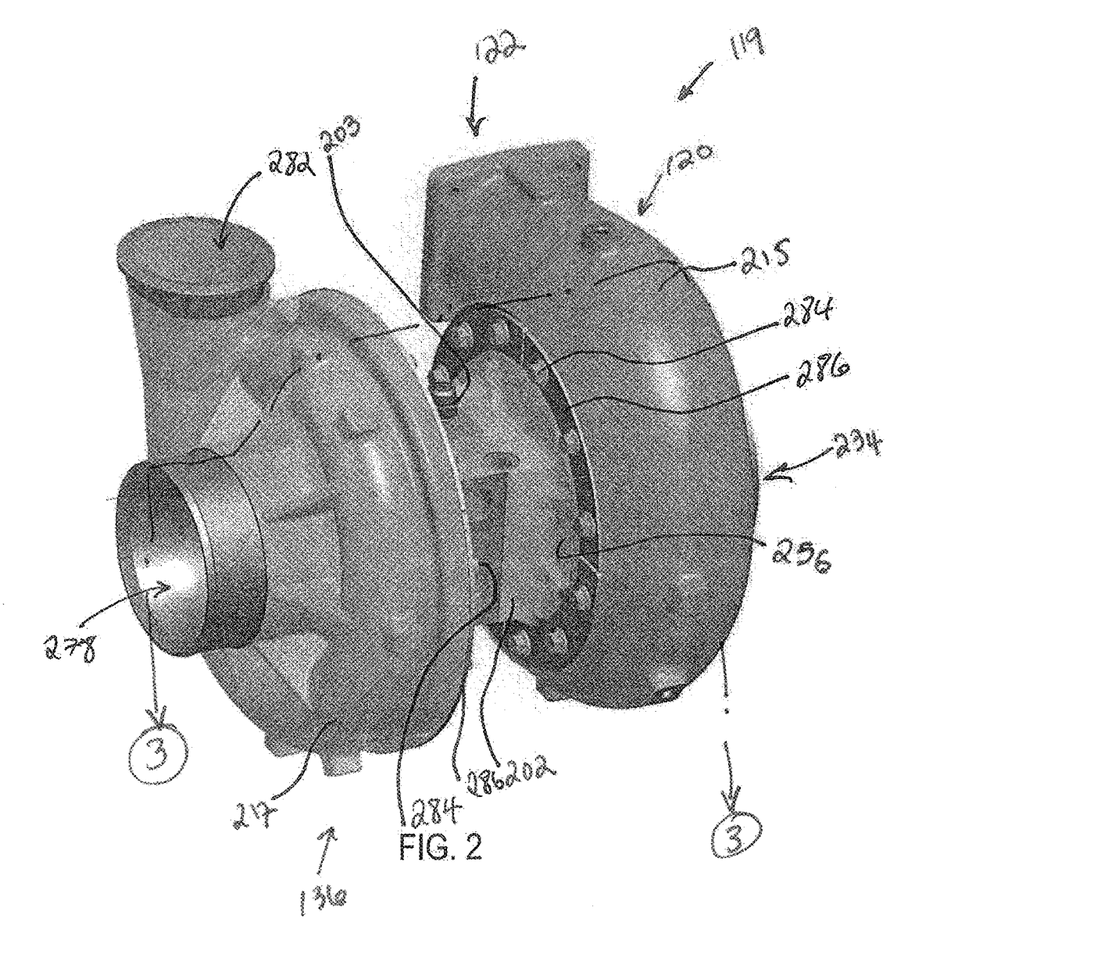
FIG. 2 is an outline view from a side perspective of a turbocharger in accordance with the disclosure.
Figure 3:
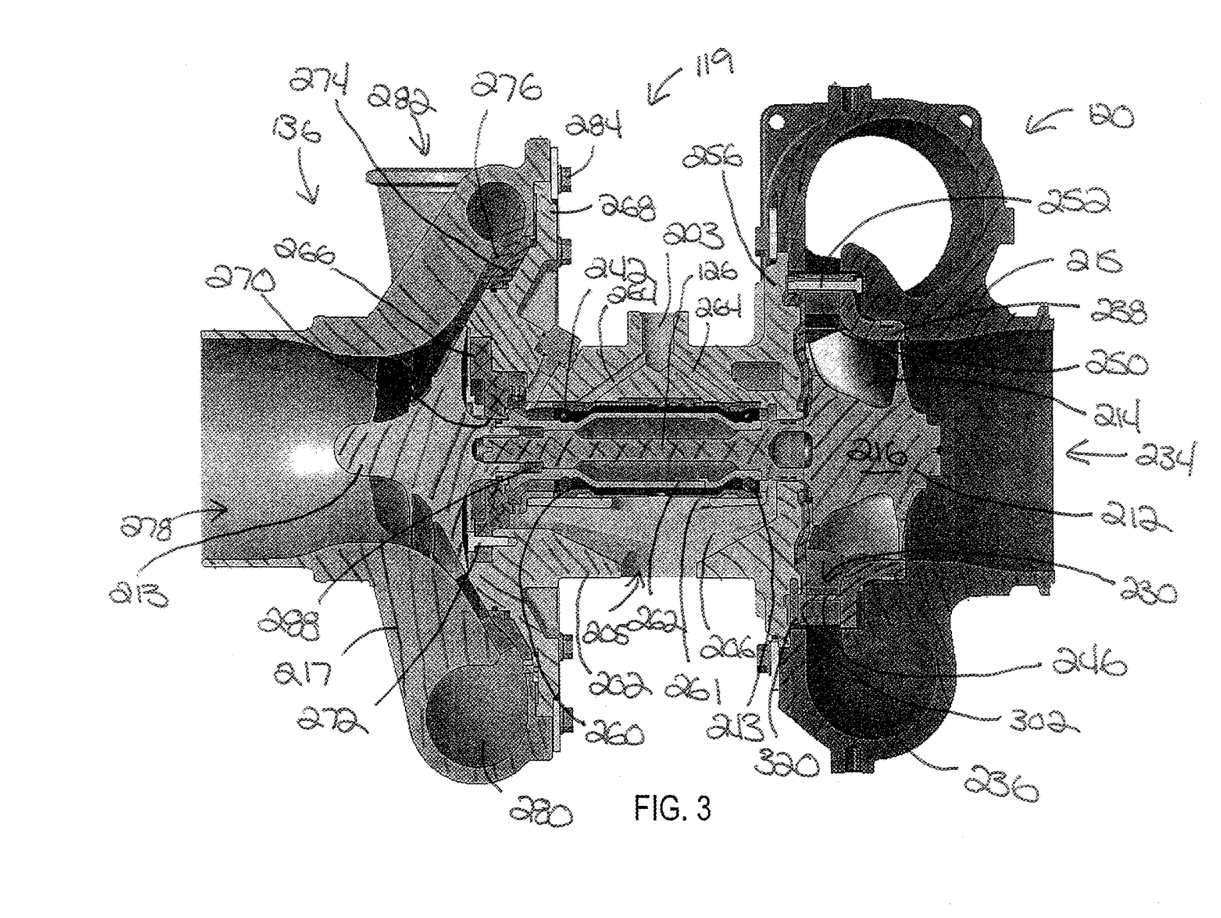
FIG. 3 is a fragmented view through a center of the turbocharger shown in FIG. 2.

An outline view of the turbocharger 119 is shown in FIG. 2, and a fragmented view is shown in FIG. 3. In reference to these figures, and in the description that follows, structures and features that are the same or similar to corresponding structures and features already described may be, at times, denoted by the same reference numerals as previously used for simplicity. As shown, the turbine assembly 120 is connected to a bearing housing 202. The bearing housing 202 surrounds a portion of the shaft 126 and includes bearings 242 and 243 disposed within a lubrication cavity 206 formed within the bearing housing 202. The lubrication cavity 206 includes a lubricant inlet port 203 and a lubricant outlet opening 205 that accommodate a flow of lubrication fluid, for example, engine oil, therethrough to lubricate the bearings 242 and 243 as the shaft 126 rotates during engine operation.

The shaft 126 is connected to a turbine wheel 212 at one end and to a compressor wheel 213 at another end. The turbine wheel 212 is configured to rotate within a turbine housing 215 that is connected to the bearing housing 202. The compressor wheel 213 is disposed to rotate within a compressor housing 217. The turbine wheel 212 includes a plurality of blades 214 radially arranged around a hub 216. The hub 216 is connected to an end of the shaft 126. In the illustrated embodiment, the turbine wheel 212 is connected at the end of the shaft 126 by welding, but other methods, such as by use of a fastener, may be used to connect the turbine wheel to the shaft. The turbine wheel 212 is rotatably disposed between an exhaust turbine nozzle 230 defined within the turbine housing 215. As described further below, a slot 229 provides exhaust gas to the turbine wheel 212 in a generally radially inward and axial direction relative to the shaft 126 and the blades 214 such that the turbine assembly 120 is a mixed flow turbine, meaning, exhaust gas is provided to the turbine wheel in both radial and axial directions. Exhaust gas passing over the turbine wheel 212 exits the turbine housing 215 via an outlet bore 234 that is formed in the housing and that is fluidly connected to the turbine assembly outlet 128 (FIG. 1). The turbine nozzle 230 is fluidly connected to an inlet gas passage 236 having a scrolled shape and formed in the turbine housing 215. The inlet gas passage 236 fluidly interconnects the turbine nozzle 230 with the turbine inlet 124 (also see FIG. 1). It is noted that a single inlet gas passage 236 is shown formed in the turbine housing 215 in FIG. 3, but in alternative embodiments separated passages may be formed in a single turbine housing.

In the embodiment shown in FIG. 3, the inlet gas passage 236 wraps around the area of the turbine wheel 212 and bore 234 and is open to the slot 229 around the entire periphery of the turbine wheel 212. A cross sectional flow area of the inlet gas passage 236 decreases along a flow path of gas entering the turbine assembly 120 via the inlet 124 and being provided to the turbine wheel 212 through the slot 230.

The bearing housing 202 encloses a portion of the shaft 126, which is rotationally mounted in a bearing bore 260 formed in the bearing housing by bearings 242 and 243. A nut 288 engaged on the shaft 126 retains the shaft 126 within the bearings 242 and 243. Each of the bearings 242 and 243 includes an outer race 261 that engages an inner diameter surface of the bore 260, rollers, and an common inner race 262 that has a generally tubular shape and extends around the shaft 126 along its length. Oil from the inlet port 203 is provided by an external oil pump to the bearings 242 and 243 during operation via passages 264, from where it washes over the bearings to cool and lubricate them before collecting in the lubrication cavity 206 and draining out of the bearing housing through the outlet opening 205.

The bearings 242 and 243 are axially retained within the bore 260 by a bearing retainer 266 disposed between a compressor mounting plate 268 formed on the bearing housing 202 and the compressor wheel 213. The bearing retainer 266 forms a central opening 270 having an inner diameter that is smaller than an inner diameter of the bearing bore 260 such that, when the bearing retainer 266 is connected to the bearing housing 202, the bearings 242 and 243 are retained within the bearing bore 260. The bearing retainer 266 is fastened to the compressor mounting plate 268 by fasteners 272, but other fastening or retention structures may be used.

The compressor assembly 136 includes a compressor vane ring 274 that forms vanes 276 disposed radially around the compressor wheel 213. The vanes 276 fluidly connect a compressor inlet bore 278, which contains the compressor wheel 213, with a compressor scroll passage 280 that is formed in the compressor housing 217 and that terminates to a compressor outlet opening 282. Bolts 284 and circular plate segments 286 connect the turbine housing 215 to the turbine flange 256 and the compressor housing 217 to the compressor mounting plate 268. A nut 288 engaged on the shaft 126 retains the shaft 126 within the bearings 242 and 243.

Figure 4:
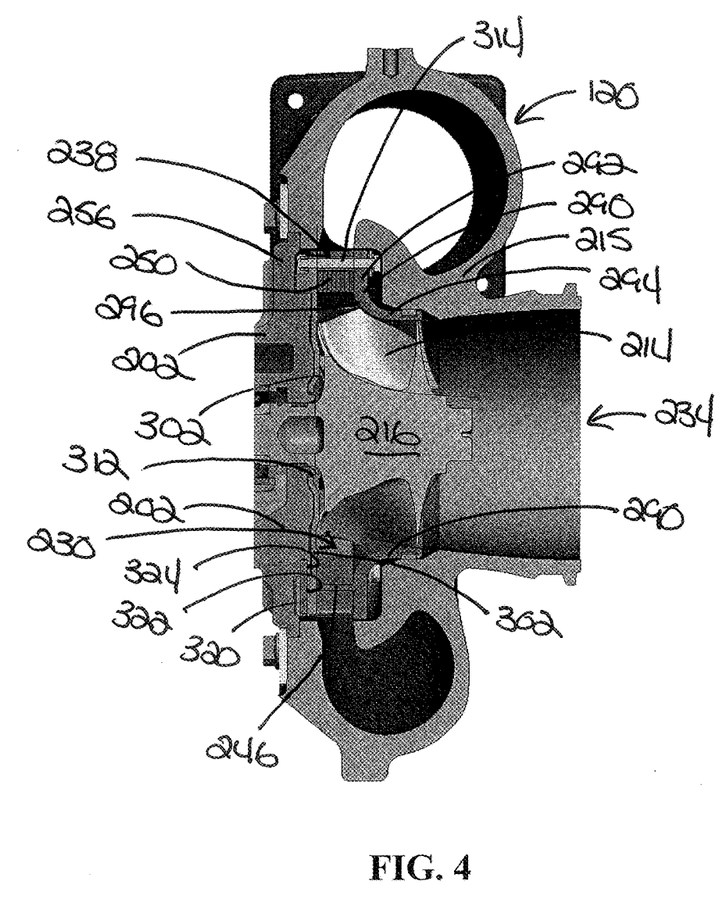
FIG. 4 is a detail section of the turbine assembly of the turbocharger shown in FIG. 2.
Figure 6:
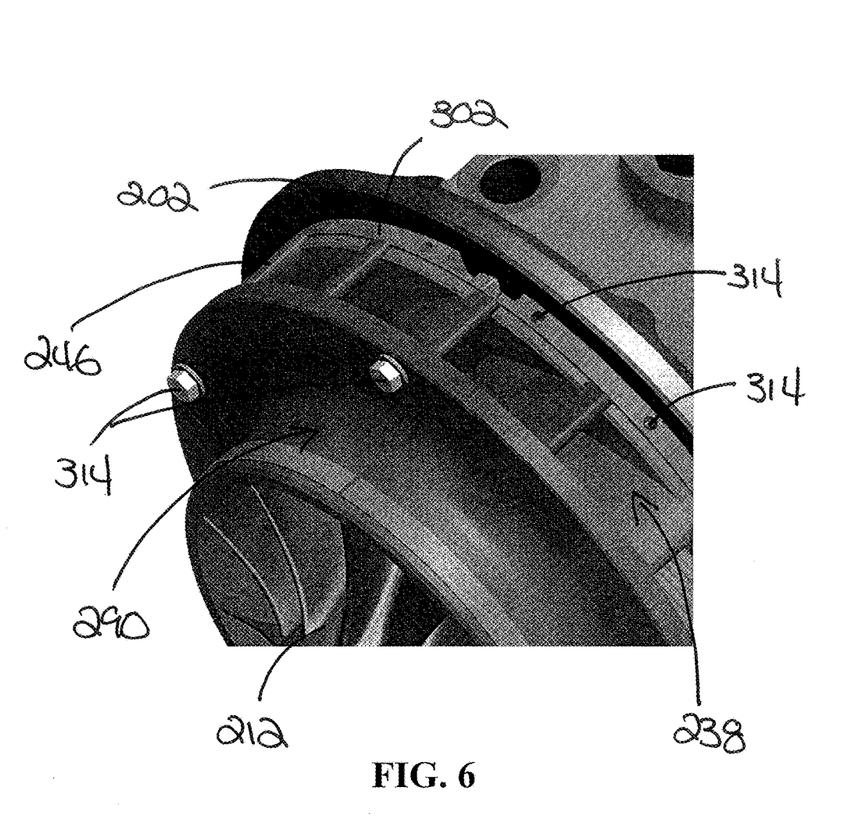
FIG. 6 is a perspective view of a section of the turbine assembly of the turbocharger shown in FIG. 2 with the turbine housing removed.

For directing the exhaust air from the inlet gas passage 236 to the area surrounding the turbine wheel 212, the turbine assembly 120 may include a nozzle ring 238. The nozzle ring 238 may have an annular configuration and extend around a portion of the radial periphery of the turbine wheel 212. As will be discussed in more detail in the paragraphs that follow, the radial nozzle ring 238 is disposed in fluid communication with the inlet gas passage 236 and may define at least a portion of the slot 229 around the wheel 212. As shown in FIG. 4, the radial nozzle ring 238 forms a plurality of fixed vanes 246 that are symmetrically disposed around the nozzle ring 238 and operate to direct exhaust gas from the inlet gas passage 236 towards the turbine wheel 212. The number, shape and configuration of the plurality of vanes 246 can vary. Flow channels 250 having an inclined shape are defined between adjacent vanes 246. As shown in FIG. 6, the vanes 246 may further have a generally curved airfoil shape to minimize flow losses of gas passing over and between the vanes, thus providing respectively uniform inflow conditions to the turbine wheel 212.

Figure 5:
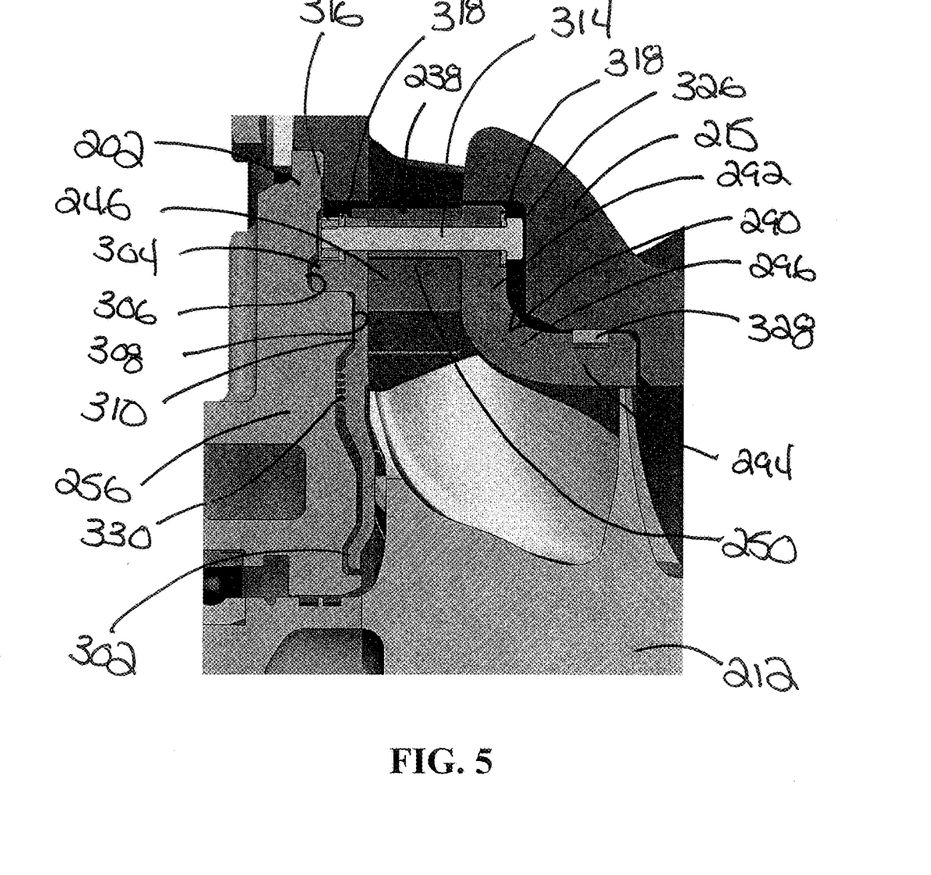
FIG. 5 is a further detail section of the turbine assembly of the turbocharger shown in FIG. 2.

To provide protection in the event of failure of the turbine wheel 212 and to further define the turbine nozzle 230 that directs exhaust gas to the turbine wheel, the turbine assembly 120 may further include a shroud 290 that surrounds at least a portion of the turbine wheel 212. The shroud 290 may be spaced outward of the turbine wheel 212 in the radial direction of the turbine wheel and extend around the entire circumference of the turbine wheel 212. Further, the shroud 290 may extend in the axial direction (as defined by the rotational axis of the turbine wheel 212) at least a portion of the axial length of the turbine wheel 212. As shown in FIG. 5, the shroud 290 may include a first leg 292 that extends substantially in the radial direction relative to the turbine wheel 212 and a second leg 294 that extends substantially in the axial direction relative to the turbine wheel 212. The first and second legs 292, 294 may be joined together by a curved intermediate portion 296. It will be appreciated, however, that the shroud 290 may have a configuration different than that shown in the drawings so long as it surrounds at least a portion of the turbine wheel 212.

According to one embodiment, the nozzle ring 238 may be integrated with the shroud 290 into a single component as shown in FIGS. 4 and 5. In particular, the vanes 246 of the nozzle ring 238 may be integrally connected with and extend axially away from the first leg 292 of the shroud 290 towards the bearing housing 202. With this arrangement, the vanes 246 may provide structural support to the shroud 290. Moreover, with such a configuration, the nozzle ring 238 and shroud 290 may be cast as a single component. This can allow both the nozzle ring 238 and shroud 290 to be constructed of a single material, which can minimize thermal mismatches between the nozzle ring 238 and the shroud 290 and thereby reduce thermal stresses in the turbine assembly 120. Additionally, integrating the nozzle ring 238 into the shroud 290 may allow for the use of relatively lower cost cast iron material for the combined nozzle ring and shroud. One example of a suitable material for the cast nozzle ring 238 and shroud 290 is high silicon, molybdenum iron, but other materials may be used. The integration of the nozzle ring 238 into the shroud 290 also provides a lower part count, which can reduce assembly complexity and cost as well as reduce the time required to service or remanufacture the turbine.

Figure 7:
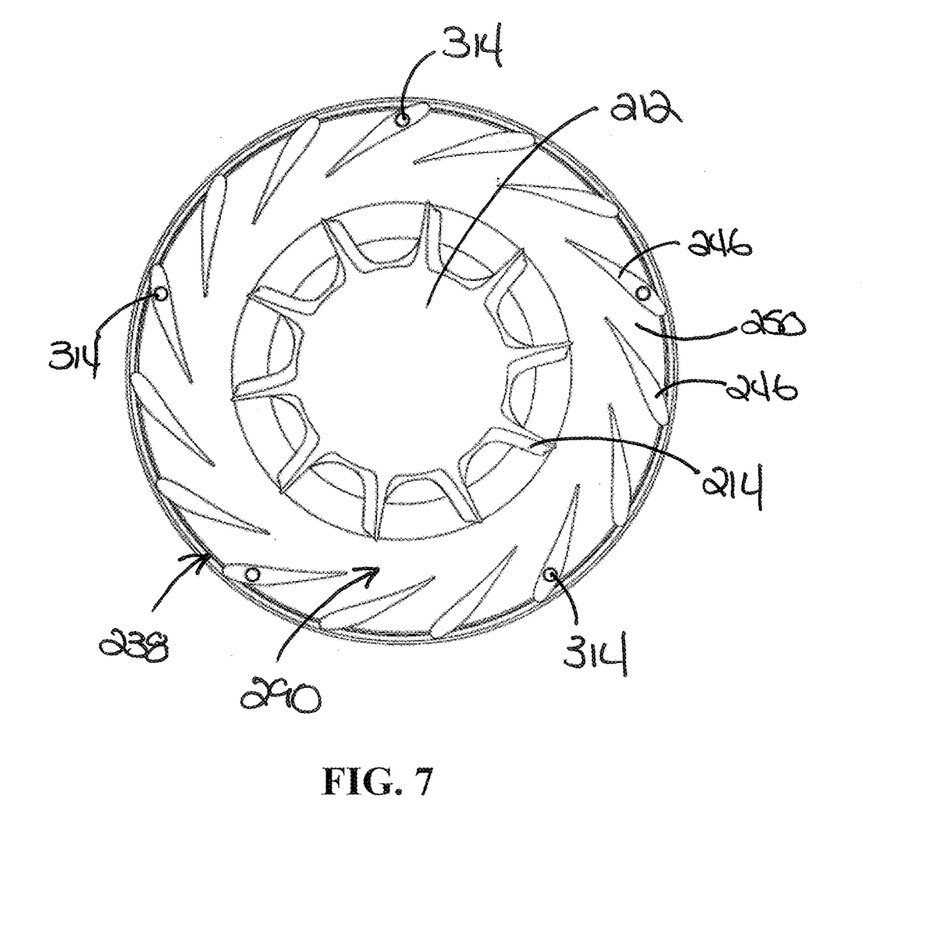
FIG. 7 is a sectional view of the nozzle ring and turbine wheel of the turbine assembly of the turbocharger shown in FIG. 2.

As indicated above, the shroud 290 and nozzle ring 238 may be configured so as to define a so-called mixed flow path from the turbine housing inlet gas passage 236 to the turbine wheel 212 such that wheel rotation may be augmented. In general, turbines can be configured for radial-flow, axial-flow (for example, such as those used in jet engines), or a hybrid type of flow that includes radial and axial components, which will herein be referred to as "mixed" flow to denote that the flow includes radial and axial flow characteristics. With respect to the illustrated embodiment, as shown in FIGS. 5 and 7, the radial flow component may be provided by the flow channels defined by the vanes 246 which are arranged and configured to direct gas passing through the flow channels defined between the vanes 246 tangentially and radially inward towards an inner diameter of the turbine wheel 212. In this portion of the shroud 290, a radial nozzle may be formed. The axial flow component may be provided by the curved intermediate portion 296 and the axially extending second leg 294 of the shroud 290 as shown in FIG. 5, which forms a converging axial nozzle along the rotational axis of the turbine, which accelerates the gases past the curved ends of the blades 214 on the turbine wheel. In particular, the curved intermediate portion 296 and the second leg 294 of the shroud 290 may define a flow path that directs at least a portion of the exhaust gas that travels through and exits the flow channels between the vanes 246 of the nozzle ring 238 in a more axial direction as it moves toward the surface of the turbine wheel 212. Turbine assemblies having mixed flow can have a lower pressure drop of the gas passing through the turbine as compared to radial flow turbine assemblies, because not all of the gases provided to drive the turbine must turn from the radial direction to the axial direction.

The configuration of the vanes 246 of the nozzle ring 238 and the shroud 290 may be adjusted to provide more pronounced radial flow or axial flow characteristics to provide a desired turbocharger performance for a particular engine configuration. For example, to facilitate matching of the flow channels 250 of the nozzle ring 238 to each specific engine rating, the nozzle ring 238 and shroud 290 may be cast with excess material in the flow channels 250 such that the flow channels can be later machined to a desired flow channel geometry for optimization of the tuning of the nozzle ring 238 to each specific engine rating. In this way, the unique flow characteristics of the turbine assembly 120 may be determined by the size, shape, number, and configuration of the flow channels 250 in the nozzle ring 238 while other portions of the turbine assembly may advantageously remain unaffected or, in the context of designing for multiple engine platforms, the remaining portions of the turbine assembly may remain substantially common for various engines and engine applications.

Accordingly, the specific flow characteristics of a turbine assembly that are suited for a particular engine system may be achieved by combining a turbine assembly, which otherwise may be common for more than one engine, with a nozzle ring 238 that has been machined after casting to a configuration that is specifically suited for that particular engine system. In contrast to casting a variety of different nozzles to match particular engine systems, casting a commonly configured nozzle ring 238, and then machining the flow channels 250 in the nozzle ring to the final desired configuration, may be more cost effective and may provide more control over the final configuration of the nozzle ring. Selection of the appropriate nozzle ring flow channel 250 configuration that corresponds to a particular engine can involve the consideration of various turbocharger operating conditions, such as exhaust gas temperature, pressure and flow rate, desired pressure difference to drive the turbine, turbine size, desired turbine A/R ratio, and others.

To help reduce heat transfer from the hot exhaust gas flowing through the turbine housing 215 to the bearing housing 202, the turbine assembly 120 may be provided with a heat shield 302. The heat shield 302 may be arranged between the bearing housing 202 and the nozzle ring 238 and shroud 290 as shown in FIGS. 4 and 5. More particularly, as shown in FIG. 5, an outer thickened portion 304 of the heat shield 302 may be captured in a complementary recess 306 in a turbine mounting flange 256 on the bearing housing 202 by the nozzle ring 238 and shroud 290. Moreover, a raised portion 308 on the turbine mounting flange 256 can engage in a complementary recess 310 formed in the side of the heat shield 302 facing the bearing housing 202. These features can help locate the heat shield 302 in the proper position relative to the bearing housing 202 during installation. The heat shield 302 may further have a center opening 312, through which the end of the shaft 126 may project. To minimize thermal stresses on the turbine assembly 120, the heat shield 302 may be made of the same material as the nozzle ring 238 and shroud 290. As noted previously, an example of a suitable material of construction for these components is high silicon, molybdenum iron, although other materials also may be used.

The shroud 290 may be spaced apart and separate from the turbine housing 122. In particular, as shown in FIGS. 4 and 5, the shroud 290 may be spaced axially inward (i.e., in the direction towards the bearing housing 202) from the turbine housing 122 so as to provide the turbine assembly 120 with a dual wall construction in the area of the shroud 290 with the shroud 290 comprising an inner wall and the turbine housing 122 comprising an outer wall. This arrangement isolates the shroud 290, and in this case the integral nozzle ring 238, from the turbine housing 122. The shroud 290 further may be configured and arranged such that it will shear off from the remainder of the turbine assembly 120 upon failure of the turbine wheel 212, such as, for example, upon a failure of the inertia weld between the turbine wheel 212 and the shaft 126. To this end, the shroud 290 and nozzle ring 238 may be secured in the turbine assembly 120 using a fastening arrangement that is configured to break or shear when a force is exerted on the shroud 290 corresponding to the force that would be exerted on the shroud 290 upon failure of the turbine wheel 212. For example, the shroud 290 may be connected to the turbine assembly 120 using one or more fasteners that are configured to shear when a predetermined force is applied to the shroud 290 either in the axial and/or the radial direction(s). It can further be noted from FIG. 5 that the turbine housing 122 includes an inner surface 319 facing a radially inward direction and positioned radially inward of the gas inlet passage 236, and that the shroud 290 includes an outer surface 321 facing a radially outward direction and positioned radially inward of the gas inlet passage 236. The outer surface 321 faces the inner surface 319 of the turbine housing 122 and extends circumferentially around the rotational axis of the turbine wheel 212.

In the illustrated embodiment, the shroud 290 and, in this case, the integral nozzle ring 238, are connected to the heat shield 302 by a plurality of shear bolts 314. As described above, the heat shield 302, in turn, is fixed relative to the bearing housing 202. Thus, the shear bolts 314 fix the shroud 290 relative to the heat shield 302 and the bearing housing 202 and hold the shroud 290 stationary relative to the rotating turbine wheel 212. As shown in FIG. 5, each shear bolt 314 may have a corresponding nut 316 secured to the shear bolt at the end of the bolt protruding through the heat shield 302. Additionally, a spring washer 318 may be arranged at each end of the shear bolt 314. The spring washers 318 may help the shear bolts 314 compensate for thermal expansion lag of the components of the turbine assembly 120 during operation. For example, the shear bolts 314, which are not directly exposed to hot gases, may thermally expand after surrounding structures, which are in direct contact with hot gases, have already expanded. Moreover, depending on the materials used, the thermal expansion coefficient between the shear bolts 314 and the surrounding structures may differ.

Additionally, the turbine assembly 120 may be configured such that the shear bolts 314 and associated nuts 316 are trapped in the turbine assembly 120 in such a way that the nuts 316 and shear bolts 314 cannot separate from each other during operation of the turbocharger 119. In particular, as shown in FIG. 5, the head of each shear bolt 314 may be captured between the first leg 292 of the shroud 290 and the turbine housing 215 and each associated nut 316 may be captured on the end of the corresponding shear bolt 314 by being interposed between the heat shield 302 and the bearing housing 202. As shown in FIG. 7, each of the shear bolts may extend from the shroud 290 to the heat shield 302 through a corresponding one of the vanes 246 of the nozzle ring 238. To this end, each of the vanes 246 that are to receive one of the shear bolts may have a passage extending in the axial direction of the turbine assembly through the vane 246 within which the respective shear bolt 314 may be inserted.

In operation, the shear bolts 314 will fracture when the turbine wheel 212 fails in such a manner that the rotating turbine wheel 212, or fragments thereof, comes into contact with the shroud 290. The fracturing of the shear bolts 314 can allow the shroud 290 to rotate within the turbine housing 215 with the still rotating broken turbine wheel 212. The rotating shroud 290 can help dissipate the energy of the broken turbine wheel 212 in a similar manner to that of a brake pad in a friction drum brake. Additionally, when the shear bolts 314 shear, producing the acceleration necessary to overcome the rotational inertia of the shroud 290 will also absorb energy generated by the failure of the turbine wheel 212. The energy absorbed by setting the shroud 290 into rotation and the braking action of the shroud 290 on the turbine housing 215 can help reduce the likelihood of a turbine wheel 212 burst and/or exit through the turbine housing 215. The use of the dual wall structure comprising the turbine housing 215 as the outer wall and the separate shroud 290 as the inner wall distributes the force of the turbine wheel 212 fragments in a turbine wheel failure situation allowing for the use of a thinner, lighter weight turbine housing 215. The force at which the shroud 290 shears from the heat shield 302 may be adjusted by varying the number of shear bolts 314, the diameter of the shear bolts and/or the material of the shear bolts. As can be seen from FIG. 7, a total of five shear bolts 314 are used in the illustrated embodiment to secure the shroud 290 to the heat shield 302. According to other embodiments, there may as few as three and as many as fifteen shear bolts 314. As will be appreciated, the present disclosure is not limited to any particular number of shear bolts 314. According to one embodiment, each of the shear bolts 314 may have a 0.187 inch diameter and be made of an alloy suitable for high temperature applications such as alloys sold under the trade name Waspaloy®. The separate, shearable shroud 290 may be configured with an integral nozzle ring 238 or may be configured such that the nozzle ring is a separate component.

Figure 8:
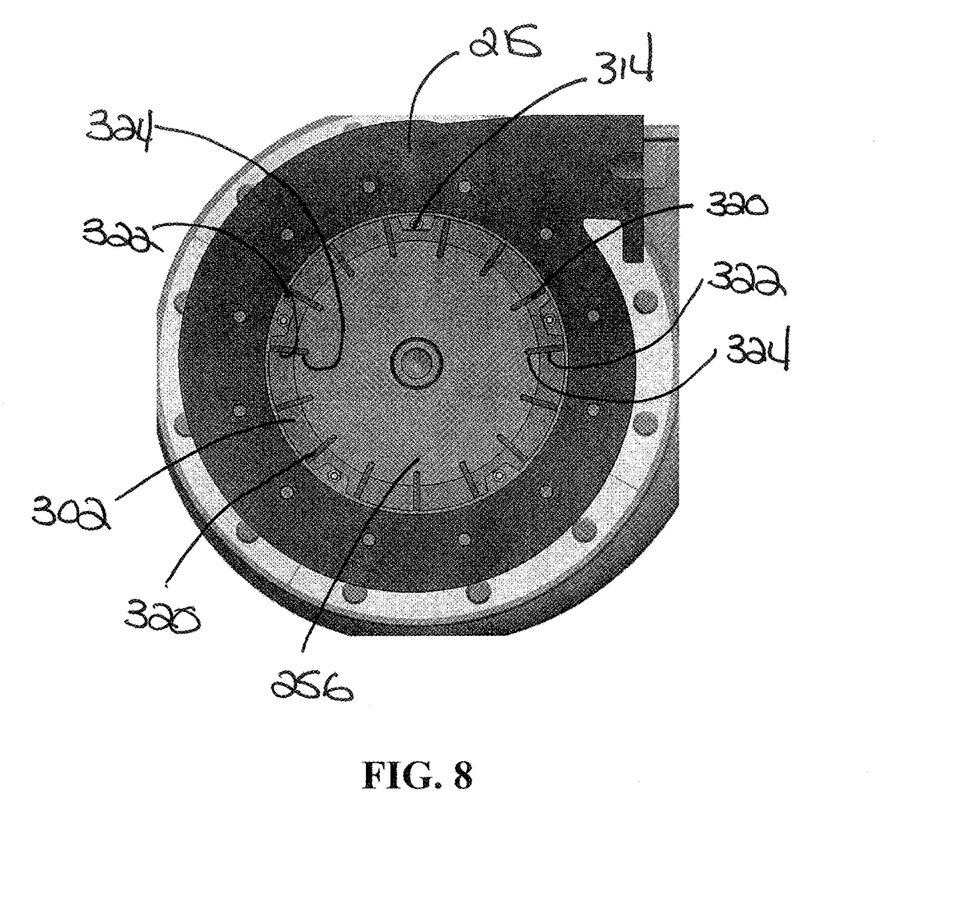
FIG. 8 is a sectional view of the turbine assembly of the turbocharger shown in FIG. 2 taken through the radial cross key pins.

To help ensure symmetrical thermal expansion of various components including the heat shield 302, the nozzle ring 238 and the shroud 290 during operation of the turbocharger 119, the heat shield 302 may be secured to the bearing housing with a plurality of symmetrically arranged stakes or radial cross key pins 320. The heat shield 302 may first be arranged on the turbine mounting flange 256 of the bearing housing 202 with an interference fit and then secured in place with the radial cross key pins 320. Each of the cross key pins 320 may be received in a corresponding one of a plurality of circumferentially spaced radially extending passages 322 in the thickened outer portion 304 of the heat shield 302 and into complementarily arranged passages 324 in the turbine mounting flange 256 of the bearing housing 202. The passages 322, 324 in the heat shield 302 and the turbine mounting flange 256 for receiving the cross key pins 320 (and the inserted cross key pins) are arranged symmetrically in a circular pattern about the rotational axis of the turbine wheel 212 as shown in FIG. 8 which provides a cross-sectional view through the heat shield 302 and pins 320. A single cross key pin 320 extending in the radial direction through the heat shield 302 and into the bearing housing 202 can be seen in FIG. 4 and the outer ends of several of the cross key pins 320 can be seen in FIG. 6.

As noted above, the shroud 290 and integral nozzle ring 238 may be attached to the heat shield 302 by, for example, the shear bolts 314. The heat shield 302 is, in turn, attached to the bearing housing 202 through the cross key pins 320. As a result, the heat shield 302, shroud 290 and nozzle ring 238 are connected together as a system. Further, the cross key pins 320 keep the heat shield 302, nozzle ring 238 and shroud 290 substantially concentric as well as keep the heat shield 302 retained to the bearing housing 202 over the thermal operating range of the turbocharger 119. More particularly, during operation of the turbocharger 119, the interconnection between the bearing housing 202 and the heat shield 302 established by the cross key pins 320 forces the heat shield 302, and with it the interconnected shroud 290 and nozzle ring, to stay concentric even when a temperature differential exists between the bearing housing 202 and the heat shield 302. For example, during operation of the turbocharger 119, the temperature of the bearing housing 202 at the turbine mounting flange 256 may be approximately 400° C. while the temperature of the heat shield 302 is approximately 700° C. The cross key pins 320 can keep the heat shield 302, shroud 290 and nozzle ring 238 concentric with respect to the turbine wheel 212 despite such a temperature differential.

The joining together of the heat shield 302, nozzle ring 238 and shroud 290 as a system can also help enable minimal loading on the cross key pins 320 and loads on the cross key pins that are symmetric. Further, constructing the shroud 290, nozzle ring 238 and heat shield 302 from the same material may avoid the generation of loads and stresses on the cross key pins 320 due to thermal mismatching of mating components. Making the nozzle ring 238 and shroud 290 as a single integral component, as discussed above, may further ensure symmetric loads on the cross key pins 320. Each of these features can allow for cross keying of the heat shield 302, nozzle ring 238 and shroud 290 without excessive distress and wear on the cross key pins 320.

As shown in FIG. 4, the passages 322, 324 in the heat shield 302 and bearing housing 202 for receiving the cross key pins 320 may be arranged such that the cross key pins 320, once inserted in their respective passages, are trapped by the turbine housing 215 such that the cross key pins 320 cannot pull out of their respective passages during operation of the turbocharger 119. In particular, an interior wall 326 of the turbine housing 215 may be arranged opposite the radially outward end of the cross key pins 320 so as block movement of the cross key pins out of their respective passages 322, 324. As shown in FIG. 8, the illustrated embodiment includes a total of fifteen radial cross key pins 320. However, a different number of cross key pins 320 may be provided so long as they are arranged symmetrically about the centerline of the turbine assembly 120. The pins may be made of any material suitable for high temperature applications, such as, for example, stainless steel.

To help seal against external leak of exhaust gases from within the turbine housing 215, the turbine assembly 120 may include one or more exhaust gas seals. For example, a first exhaust gas seal 328 may be arranged between the turbine shroud 290 and the turbine housing 215. As shown in FIG. 5, the first exhaust gas seal 328 may extend between the second leg 294 of the shroud 290 and the inside wall of the turbine housing 215. In this position, the first exhaust gas seal 328 may prevent exhaust gas from bypassing the flow channels 250 in the nozzle ring 238 and escaping to the outlet bore 234 through the space between the shroud 290 and the turbine housing 215. A second exhaust gas seal 330 may further be arranged between the heat shield 302 and the bearing housing 202. The second exhaust gas seal 330 may comprise a plurality of knife edge seals on the side of the heat shield 302 facing the turbine mounting flange 256 of the bearing housing 202. The knife edge seals of the second exhaust gas seal 330 may extend into engagement with the turbine mounting flange 256. The locations of the first and second exhaust gas seals 328, 330 shown in FIG. 5 can help achieve a pressure balance across the nozzle ring 238, shroud 290 and heat shield 302 assembly at maximum turbine pressures which, in turn, can further help minimize loading on the cross key pins 320. As will be appreciated by those skilled in the art, additional seals and alternative sealing arrangements may also be provided.

INDUSTRIAL APPLICABILITY

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A turbocharger comprising:
a turbine housing including a gas inlet passage;
a turbine wheel that has a plurality of blades and is arranged in the turbine housing about a rotational axis;
a bearing housing connected to the turbine housing;
a shaft rotatably supported in the bearing housing and connected to the turbine wheel;
a shroud arranged in surrounding relation to at least a portion of the turbine wheel, the shroud being arranged in axially spaced relation from the turbine housing;
the turbine housing including an inner surface facing a radially inward direction and positioned radially inward of the gas inlet passage;
the shroud including an outer surface facing a radially outward direction and positioned radially inward of the gas inlet passage, and the outer surface further facing the inner surface of the turbine housing and extending circumferentially around the rotational axis of the turbine wheel; and
a fastening system securing the shroud at a fixed position relative to the bearing housing, and including a fastener positioned radially inward of the outer surface of the shroud and the inner surface of the turbine housing, and the fastener being configured to fracture when a force is exerted on the shroud corresponding to the turbine wheel contacting the shroud when the turbine wheel is rotating.

2. The turbocharger of claim 1 further including a heat shield that is secured to the bearing housing and wherein the fastening system secures the shroud to the heat shield.

3. The turbocharger of claim 2 wherein the fastening system comprises a plurality of shear bolts, and wherein the fastener is one of the plurality of shear bolts.

4. The turbocharger of claim 3 further including a nozzle ring interposed between the shroud and the heat shield, the nozzle ring being disposed around the turbine wheel and including a plurality of vanes with flow channels being defined between the vanes that are in fluid communication with the gas inlet passage and with the turbine wheel.

5. The turbocharger of claim 4 wherein the nozzle ring is integrally formed with the shroud.

6. The turbocharger of claim 5 wherein the flow channels defined by the vanes are configured to direct gas tangentially and radially inward toward an inner diameter of the turbine wheel and the shroud is configured to define a flow path in communication with the gas inlet passage and the flow channels and that extends in a direction parallel to a rotational axis of the turbine wheel.

7. The turbocharger of claim 3 wherein each shear bolt has an associated spring washer.

8. The turbocharger of claim 3 wherein each shear bolt is trapped at a first end between the shroud and the turbine housing and at a second end between the heat shield and the bearing housing.

9. The turbocharger of claim 1 wherein the shroud is configured to be rotatable relative to turbine housing when the fastener of the fastening system fractures.

10. A method for dissipating energy resulting from failure of a rotating turbine wheel in a turbocharger, the turbine wheel being arranged in a turbine housing and being connected to a shaft that is rotatably supported in a bearing housing, the method comprising:
arranging a shroud in surrounding relation to at least a portion of the turbine wheel, the shroud being arranged in axially spaced relation from the turbine housing; and
securing the shroud relative to the bearing housing with a fastening system configured to fracture when a force is exerted on the shroud corresponding to at least a portion of the turbine wheel contacts the shroud while the turbine wheel is rotating, wherein the shroud is configured to rotate relative to the turbine housing when a fastener in the fastening system fractures, and wherein a turbine nozzle fluidly connects the gas inlet passage to the turbine wheel and a portion of the shroud extends in an axial direction toward the bearing housing and is positioned in a gas flow path extending through the turbine nozzle between the gas inlet passage and the turbine wheel.

11. The method of claim 10 wherein the securing the shroud further includes securing the shroud with a fastening system that secures the shroud to a heat shield that is secured to the bearing housing.

12. The method of claim 11 wherein the securing the shroud further includes securing the shroud with a fastening system that comprises a plurality of shear bolts.

13. The method of claim 12 further including providing a nozzle ring interposed between the shroud and the heat shield, the nozzle ring being disposed around the turbine wheel and including a plurality of vanes with flow channels being defined between the vanes that are in fluid communication the gas inlet passage and with the turbine wheel.

14. The method of claim 13 wherein the providing a nozzle ring further includes providing a nozzle ring where the nozzle ring is integrally formed with the shroud.

15. The method of claim 13 wherein the providing a nozzle ring further includes providing a nozzle ring including a plurality of vanes where the flow channels defined by the vanes are configured to direct gas tangentially and radially inward toward an inner diameter of the turbine wheel, and the shroud is configured to define a flow path in communication with the gas inlet passage and the flow channels and that extends in a direction parallel to a rotational axis of the turbine wheel.

16. An internal combustion engine having a plurality of combustion chambers formed in a cylinder block, an intake manifold disposed to provide air or a mixture of air with exhaust gas to the combustion chambers, and an exhaust manifold disposed to receive exhaust gas from the combustion chambers, the engine further comprising:
a turbine housing including a gas inlet passage;
a turbine wheel that has a plurality of blades and is arranged in the turbine housing about a rotation axis of the turbine wheel;
a bearing housing connected to the turbine housing;
a shaft rotatably supported in the bearing housing and connected to the turbine wheel;
a shroud arranged in surrounding relation to at least a portion of the turbine wheel, the shroud being arranged in spaced relation from and not in contact with the turbine housing;

the turbine housing including an inner surface facing a radially inward direction and positioned radially inward of the gas inlet passage;

the shroud including an outer surface facing a radially outward direction and positioned radially inward of the gas inlet passage, and the outer surface further facing the inner surface of the turbine housing and extending circumferentially around the rotational axis of the turbine wheel; and a fastening system securing the shroud at a fixed position relative to the bearing housing, and including a fastener positioned radially inward of the outer surface of the shroud and the inner surface of the turbine housing, and being configured to fracture when a force is exerted on the shroud corresponding to the turbine wheel contacting the shroud when the turbine wheel is rotating.

17. The engine of claim 16 further including a heat shield that is secured to the bearing housing and wherein the fastening system secures the shroud to the heat shield.

18. The engine of claim 17 wherein the fastening system comprises a plurality of shear bolts.

19. The engine of claim 18 further including a nozzle ring interposed between the shroud and the heat shield, the nozzle ring being disposed around the turbine wheel and including a plurality of vanes with flow channels being defined between the vanes that are in fluid communication the gas inlet passage and with the turbine wheel.

20. The engine of claim 19 wherein the flow channels defined by the vanes are configured to direct gas tangentially and radially inward toward an inner diameter of the turbine wheel and the shroud is configured to define a flow path in communication with the gas inlet passage and the flow channels and that extends in a direction parallel to a rotational axis of the turbine wheel.

* * * * *